(12) United States Patent
Kooiman et al.

(10) Patent No.: US 11,661,178 B2
(45) Date of Patent: *May 30, 2023

(54) TAIL ROTOR GEARBOX SUPPORT ASSEMBLIES FOR HELICOPTERS

(71) Applicant: Textron Innovations Inc., Providence, RI (US)

(72) Inventors: James Everett Kooiman, Fort Worth, TX (US); Jeffrey Matthew Williams, Hudson Oaks, TX (US); Clegg Benjamin Brian Smith, Keller, TX (US); Michael Edwin Rinehart, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/336,185

(22) Filed: Jun. 1, 2021

(65) Prior Publication Data

US 2021/0339852 A1  Nov. 4, 2021

Related U.S. Application Data

(63) Continuation of application No. 16/290,797, filed on Mar. 1, 2019, now Pat. No. 11,034,440.

(51) Int. Cl.
*B64C 27/82* (2006.01)
(52) U.S. Cl.
CPC ...... *B64C 27/82* (2013.01); *B64C 2027/8254* (2013.01); *B64C 2027/8272* (2013.01)

(58) Field of Classification Search
CPC .............. B64C 11/001; B64C 27/82; B64C 2027/8263; B64C 2027/8272; B64C 2027/8218; B64C 2027/8254
See application file for complete search history.

(56) References Cited

U.S. PATENT DOCUMENTS

| 2,322,715 A | 6/1943 | Theodore |
| 3,212,583 A | 10/1965 | Todd et al. |
| 3,506,219 A | 4/1970 | Mouille et al. |

(Continued)

OTHER PUBLICATIONS

Aviation International News, Alexa Rexroth, "Pilot Report, Helicopteres Guimbal Cabri G2, Two-Seater Helps Boost New Pilots' Confidence," Apr. 2018.

*Primary Examiner* — Christopher D Hutchens
*Assistant Examiner* — Michael A. Fabula
(74) *Attorney, Agent, or Firm* — Lawrence Youst PLLC

(57) ABSTRACT

A tail rotor assembly coupled to a tailboom of a helicopter includes a tail rotor gearbox having top, bottom and aft sides and a shroud surrounding the tail rotor gearbox. The shroud includes a shroud airframe having top and bottom portions. The tail rotor assembly includes a tail rotor gearbox support assembly configured to support the tail rotor gearbox within the shroud. The tail rotor gearbox support assembly includes a support column coupling the aft side of the tail rotor gearbox between the top and bottom portions of the shroud airframe, an upper support crossbar coupling the top side of the tail rotor gearbox between the support column and the tailboom airframe and a lower support crossbar coupling the bottom side of the tail rotor gearbox between the support column and the tailboom airframe.

20 Claims, 9 Drawing Sheets

(56) References Cited

U.S. PATENT DOCUMENTS

| | | | |
|---|---|---|---|
| 4,506,849 | A | 3/1985 | Lemont |
| 4,585,391 | A | 4/1986 | Vuillet et al. |
| 4,927,331 | A | 5/1990 | Vuillet |
| 5,102,067 | A | 4/1992 | Weiner et al. |
| 5,108,044 | A | 4/1992 | Weiner et al. |
| 5,131,604 | A | 7/1992 | Yoerkie, Jr. et al. |
| 5,388,785 | A | 2/1995 | Rollet et al. |
| 5,415,525 | A | 5/1995 | Desjardins et al. |
| 5,478,204 | A | 12/1995 | Desjardins et al. |
| 5,498,129 | A | 3/1996 | Dequin et al. |
| 5,605,440 | A | 2/1997 | Bocoviz et al. |
| 5,634,611 | A | 6/1997 | Marze et al. |
| 5,810,285 | A | 9/1998 | LeMasurier |
| 8,950,700 | B2 | 2/2015 | Westhuizen |
| 9,067,676 | B1 | 6/2015 | Hethcock et al. |
| 9,205,911 | B2 | 12/2015 | Beroul |
| 9,453,516 | B2 | 9/2016 | Kreitmair-Steck |
| 9,701,405 | B2 | 7/2017 | Stuck |
| 9,932,123 | B2 | 4/2018 | Maloney et al. |
| 10,210,856 | B1 | 2/2019 | Hefner et al. |
| 11,034,440 | B2 * | 6/2021 | Kooiman ................ B64C 27/82 |
| 2014/0321968 | A1 | 10/2014 | Kreitmair-Steck |
| 2014/0374534 | A1 | 12/2014 | McCollough et al. |
| 2015/0307190 | A1 | 10/2015 | Probst et al. |
| 2020/0277049 | A1 * | 9/2020 | Kooiman ................ B64C 27/82 |
| 2020/0385111 | A1 | 12/2020 | Groninga et al. |

\* cited by examiner

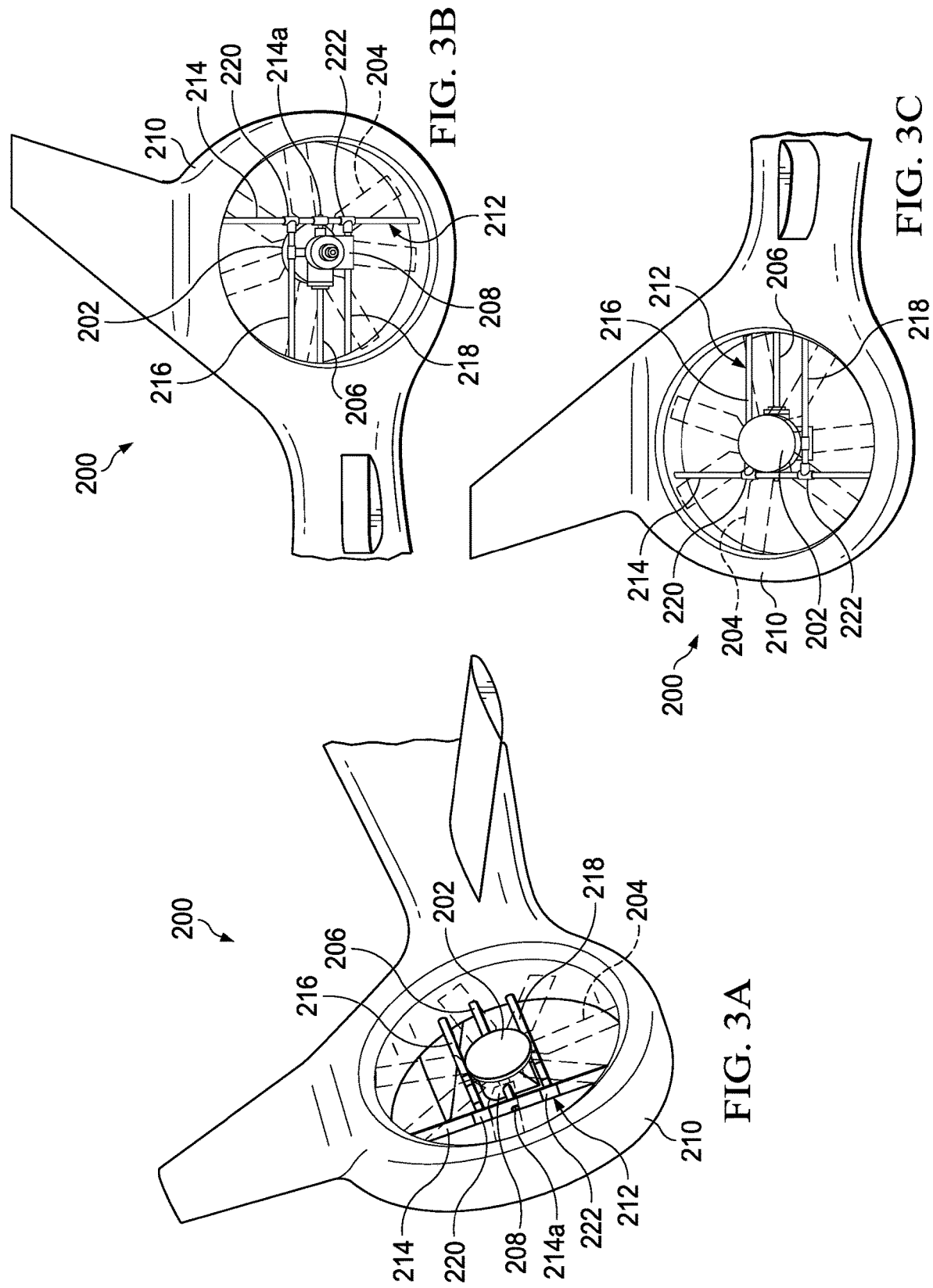

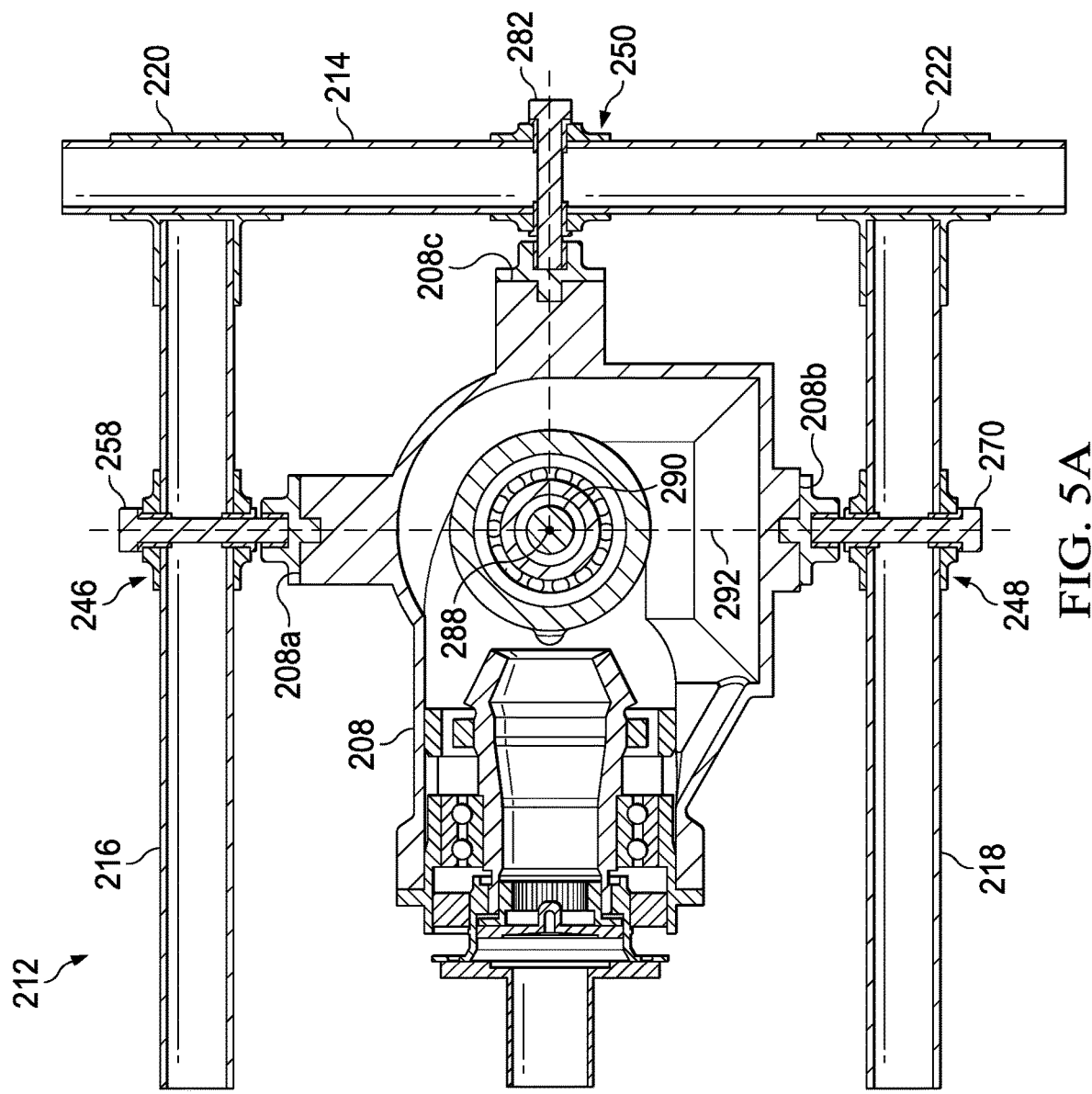

TAIL ROTOR GEARBOX SUPPORT ASSEMBLIES FOR HELICOPTERS

CROSS-REFERENCE TO RELATED APPLICATIONS

The present application is a continuation of co-pending application Ser. No. 16/290,797 filed Mar. 1, 2019.

TECHNICAL FIELD OF THE DISCLOSURE

The present disclosure relates, in general, to tail rotor gearbox support assemblies for use on helicopters and, in particular, to tail rotor gearbox support assemblies for shrouded tail rotor assemblies operable to support a tail rotor gearbox within the shroud of the tail rotor assembly using a support column and support crossbars.

BACKGROUND

Helicopter anti-torque systems counteract the moment exerted on the helicopter fuselage by the main rotor and generally manage yaw during flight. The most common type of helicopter anti-torque system is a tail rotor located on the aft end of the helicopter's tailboom. One implementation of a tail rotor utilizes a shroud that partially or fully surrounds the tail rotor hub assembly including the rotor blades emanating therefrom. The tail rotor hub assembly and gearbox of a shrouded tail rotor is not typically directly mounted onto or within the fuselage, tailboom or body of the helicopter, but is instead suspended at or near the center of the aperture formed by the shroud to maintain a desired tip gap between the tail rotor blades and shroud. This tip gap, along with other characteristics of the interior of the shroud such as inflow and outflow radii and outflow expansion angle, may be adjusted to enhance the thrust performance of the shrouded tail rotor. Shrouds also serve a number of other important functions for the helicopter, including preventing injury to ground personnel when the helicopter is grounded, protecting the tail rotor from debris or ground obstacles during flight and reducing the footprint and acoustic signature of the tail rotor.

Because shrouded tail rotors must maintain a consistent tip gap between the tail rotor blades and the shroud to enhance thrust and prevent collision between these two parts, the means by which the shrouded tail rotor suspends and supports the tail rotor gearbox within the shroud must meet certain stability, reliability and aerodynamic standards. Some existing shrouded tail rotors utilize a tail rotor gearbox housing that encases the tail rotor gearbox and is suspended within the shroud using a stator assembly. Such tail rotor gearbox housings negatively impact the weight and drag of the helicopter. Other existing shrouded tail rotors, in addition to utilizing a tail rotor gearbox housing, employ a stator assembly having several radially emanating spokes that completely encircle the tail rotor gearbox to attach the tail rotor gearbox housing to the shroud. Such stator assemblies fail to transfer torque and thrust loads to stable airframe components in the tailboom in a weight-efficient manner, relying on structural components having less stiffness such as the aft portion of the shroud. The large number of spokes also increase the amount of noise emitted by the shrouded tail rotor. Accordingly, a need has arisen for tail rotor gearbox support assemblies that reduce weight, noise and drag while maintaining the stability, reliability, load transfer and aerodynamic requirements of the tail rotor.

SUMMARY

In a first aspect, the present disclosure is directed to a tail rotor assembly coupled to a tailboom of a helicopter. The tailboom has a tailboom airframe. The tail rotor assembly includes a tail rotor gearbox having top, bottom and aft sides and a shroud surrounding the tail rotor gearbox. The shroud includes a shroud airframe having top and bottom portions. The tail rotor assembly includes a tail rotor gearbox support assembly configured to support the tail rotor gearbox within the shroud. The tail rotor gearbox support assembly includes a support column coupling the aft side of the tail rotor gearbox between the top and bottom portions of the shroud airframe, an upper support crossbar coupling the top side of the tail rotor gearbox between the support column and the tailboom airframe and a lower support crossbar coupling the bottom side of the tail rotor gearbox between the support column and the tailboom airframe.

In some embodiments, the tail rotor gearbox may experience torque and thrust loads during tail rotor operation and the tail rotor gearbox support assembly may transfer the torque and thrust loads to the tailboom. In certain embodiments, the support column may be a substantially vertical support column. In some embodiments, the aft side of the tail rotor gearbox may be coupled to a midpoint of the support column. In certain embodiments, the upper and lower support crossbars may have aft ends coupled to the support column. In some embodiments, the upper and lower support crossbars may be substantially horizontal support crossbars. In certain embodiments, the upper and lower support crossbars may each be perpendicular to the support column. In some embodiments, the support column and the upper and lower support crossbars may be tubular. In certain embodiments, the upper and lower support crossbars and the support column may each have an aerodynamic cross-sectional shape. In some embodiments, the upper and lower support crossbars may be substantially parallel.

In certain embodiments, the tail rotor gearbox support assembly may include a column pin joint assembly coupling the support column to the aft side of the tail rotor gearbox, an upper crossbar pin joint assembly coupling the upper support crossbar to the top side of the tail rotor gearbox and a lower crossbar pin joint assembly coupling the lower support crossbar to the bottom side of the tail rotor gearbox. In some embodiments, the upper crossbar pin joint assembly may include a first support crossbar fitting, a first tail rotor gearbox fitting and a first pin, the lower crossbar pin joint assembly may include a second support crossbar fitting, a second tail rotor gearbox fitting and a second pin and the column pin joint assembly may include a support column fitting, an aft tail rotor gearbox fitting and a third pin. In such embodiments, the first pin may be insertable into the first support crossbar fitting, the upper support crossbar and the first tail rotor gearbox fitting, the second pin may be insertable into the second support crossbar fitting, the lower support crossbar and the second tail rotor gearbox fitting and the third pin may be insertable into the support column fitting, the support column and the aft tail rotor gearbox fitting to secure the tail rotor gearbox. In certain embodiments, each pin may define a respective axis and the tail rotor gearbox may be moveable along at least one of the axes. In some embodiments, the first support crossbar fitting and the first tail rotor gearbox fitting may form a first gap therebetween, the second support crossbar fitting and the second tail rotor gearbox fitting may form a second gap therebetween and the support column fitting and the aft tail rotor gearbox fitting may form a third gap therebetween. In such embodiments, the gaps may accommodate thermal expansion of the tail rotor gearbox. In certain embodiments, the tail rotor assembly may have an axis of rotation and the pins may be radially aligned with the axis of rotation. In some embodiments, the tail rotor gearbox support assembly may include first and second tee connectors coupling aft ends of the upper and lower support crossbars to the support column.

In a second aspect, the present disclosure is directed to a helicopter including a fuselage, a tailboom including a tailboom airframe extending from the fuselage and a tail rotor assembly coupled to the tailboom. The tail rotor assembly includes a tail rotor gearbox having top, bottom and aft sides, a shroud including a shroud airframe having top and bottom portions surrounding the tail rotor gearbox and a tail rotor gearbox support assembly configured to support the tail rotor gearbox within the shroud. The tail rotor gearbox support assembly includes a support column coupling the aft side of the tail rotor gearbox between the top and bottom portions of the shroud airframe, an upper support crossbar coupling the top side of the tail rotor gearbox between the support column and the tailboom airframe and a lower support crossbar coupling the bottom side of the tail rotor gearbox between the support column and the tailboom airframe.

In some embodiments, the tail rotor assembly may be canted from a vertical plane of the helicopter. In certain embodiments, the support column, the upper support crossbar and the lower support crossbar may each be coupled to the tail rotor gearbox by a respective pin joint assembly including a pin. In some embodiments, the support column, the upper support crossbar and the lower support crossbar may be radially nonaligned with the axis of rotation of the tail rotor assembly and the pins may be radially aligned with the axis of rotation of the tail rotor assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3C are various views of a tail rotor assembly in accordance with embodiments of the present disclosure;

FIGS. 5A-5D are cross-sectional views of a tail rotor gearbox support assembly in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
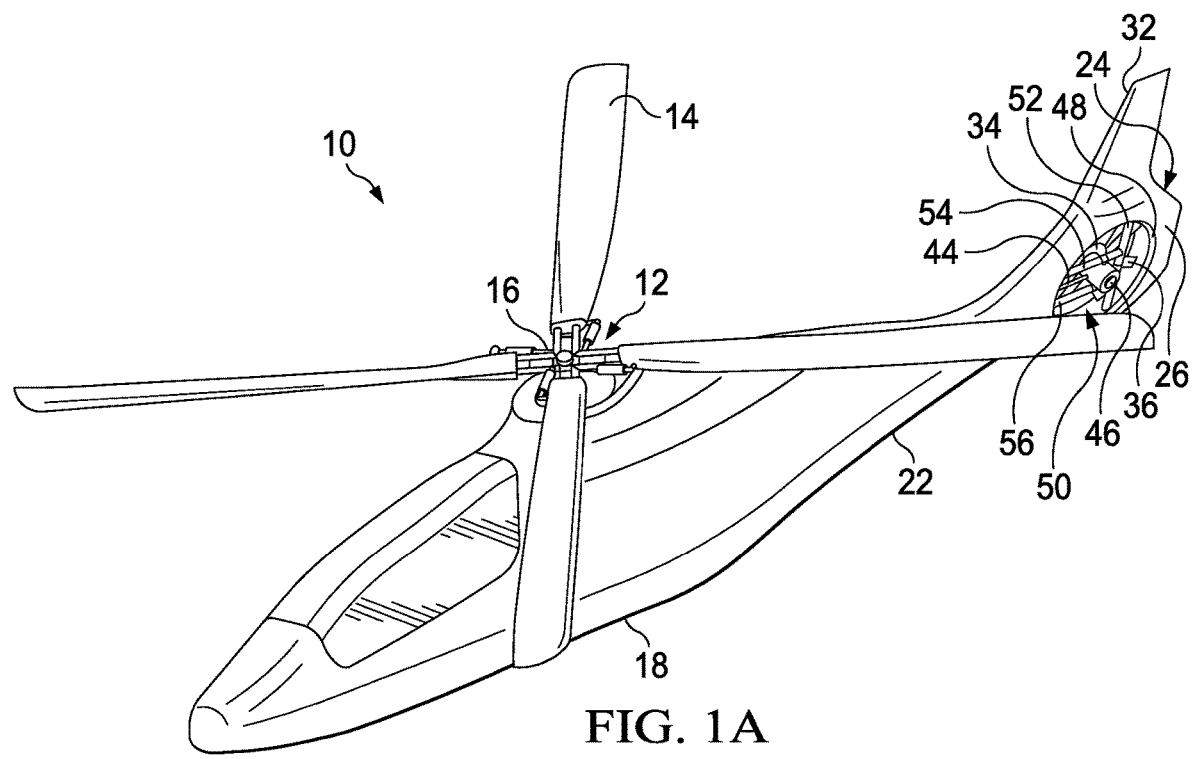
FIGS. 1A-1C are schematic illustrations of a helicopter having a tail rotor gearbox support assembly in accordance with embodiments of the present disclosure.
Figure 1B:
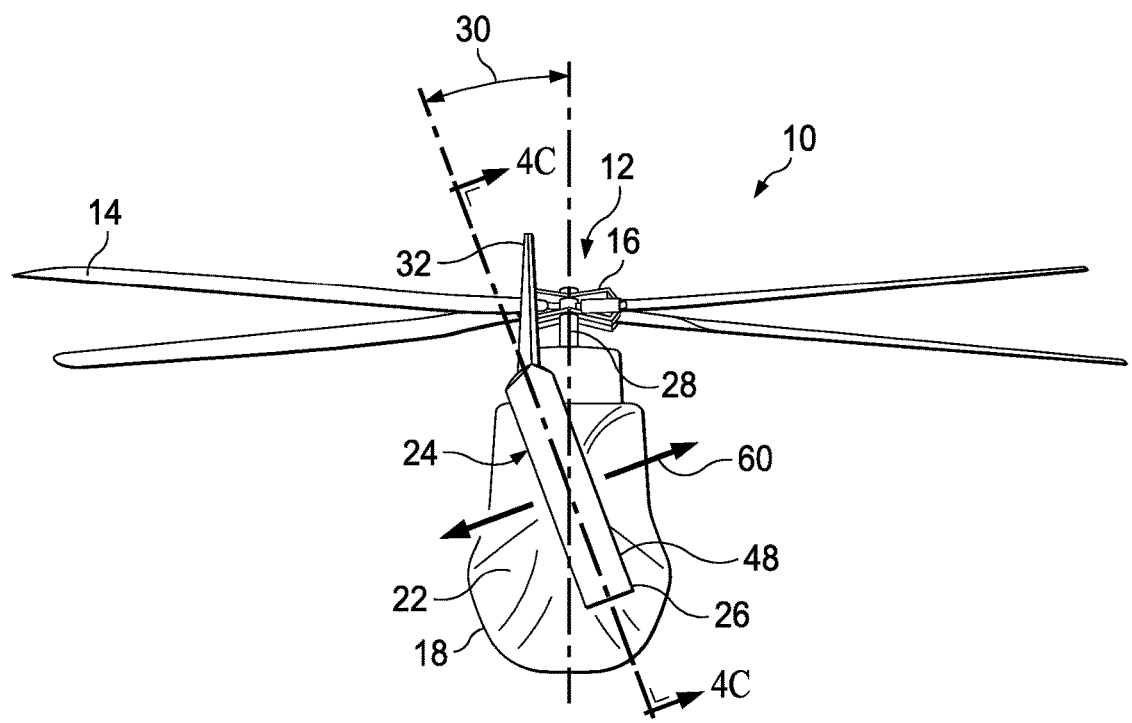
Figure 1C:
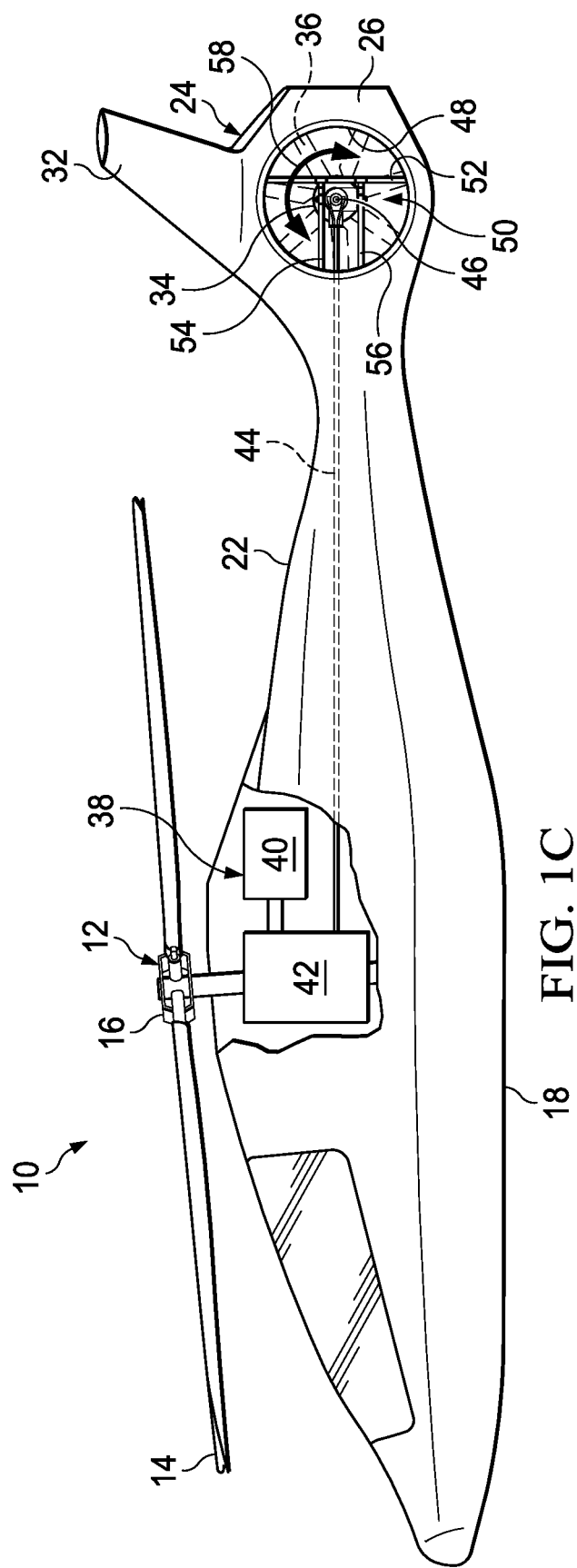

Referring to FIGS. 1A-1C in the drawings, a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18. Main rotor hub 16 is rotatable relative to fuselage 18. The pitch of rotor blades 14 can be collectively and/or cyclically manipulated to selectively control direction, thrust and lift of helicopter 10. A retractable landing gear system may provide ground support for helicopter 10.

A tailboom 22 is coupled to fuselage 18 and extends from fuselage 18 in the aft direction. An anti-torque system 24 includes a tail rotor assembly 26 coupled to an aft end of tailboom 22. Anti-torque system 24 controls the yaw of helicopter 10 by counteracting the torque exerted on fuselage 18 by main rotor assembly 12. As best seen in FIG. 1B, tail rotor assembly 26 is canted relative to a vertical plane 28 of helicopter 10. Tail rotor assembly 26 is canted by an angle 30 of about 15 to 20 degrees. Cant angle 30 may be any angle, however, in a range between 0 and 45 degrees. In some embodiments, cant angle 30 may be 0 degrees and tail rotor assembly 26 may be aligned with vertical plane 28 of helicopter 10. Tail rotor assembly 26 includes a vertical fin 32 that is substantially parallel with vertical plane 28 of helicopter 10. In other embodiments, vertical fin 32 may be substantially parallel to or aligned with tail rotor assembly 26 such that vertical fin 32 is also canted at cant angle 30 from vertical plane 28 of helicopter 10.

Tail rotor assembly 26 includes a tail rotor hub 34 having tail rotor blades 36 emanating radially therefrom. While tail rotor hub 34 is illustrated as including seven tail rotor blades 36, tail rotor hub 34 may have any number of tail rotor blades. Tail rotor blades 36 may be uniformly or nonuniformly radially spaced from one another. For example, tail rotor blades 36 may be nonuniformly spaced to reduce the noise generated when tail rotor blades 36 pass adjacent stationary or nonrotating components of tail rotor assembly 26. Tail rotor hub 34 receives rotational energy from a drivetrain 38 that includes an engine 40 or other power source, a main transmission or gearbox 42, a tail rotor driveshaft 44 and a tail rotor gearbox 46. Engine 40, main transmission 42, tail rotor driveshaft 44 and tail rotor gearbox 46 are interconnected such that rotational energy generated by engine 40 is delivered to tail rotor hub 34 to produce thrust. The magnitude of anti-torque thrust generated by tail rotor assembly 26 may be adjusted in a variety of ways. For example, tail rotor blades 36 may be variable pitch tail rotor blades whose pitch is collectively changeable by a pitch mechanism. In another example, tail rotor blades 36 may be fixed pitch tail rotor blades and tail rotor gearbox 46 or another portion of drivetrain 38 may be clutchable and/or have a variable rotational speed.

Tail rotor assembly 26 includes a shroud, or duct, 48 that surrounds tail rotor hub 34 and tail rotor gearbox 46. Shroud 48 may serve a variety of functions. For example, shroud 48 may protect ground personnel from coming into contact with rotating tail rotor blades 36 and may block debris from hitting tail rotor blades 36 during flight. Shroud 48 may also be used to enhance the anti-torque thrust generated by tail rotor assembly 26 by utilizing a duct effect as is known by those of ordinary skill in the art. Indeed, the term "shroud" encompasses any type of duct, whether or not a duct effect is produced. All or a portion of shroud 48 may also provide structural support for other components of tail rotor assembly 26 such as tail rotor gearbox 46. For example, the forward portion of shroud 48 may be structurally tied to tailboom 22 so as to provide a stable structural base from which to support tail rotor gearbox 46 while the aft portion of shroud 48 may be nonstructurally supportive and lighter to conserve weight.

Tail rotor assembly 26 includes a tail rotor gearbox support assembly 50 to support tail rotor gearbox 46 within shroud 48. Tail rotor gearbox support assembly 50 substantially centers tail rotor gearbox 46 within the aperture formed by shroud 48 to maintain a substantially constant and/or predetermined tip gap between tail rotor blades 36 and shroud 48. Tail rotor gearbox support assembly 50 includes a support column 52 coupled to the aft side of tail rotor gearbox 46. Support column 52 is substantially vertical and has a top end fixedly coupled to the top portion of shroud 48 and a bottom end fixedly coupled to the bottom portion of shroud 48. Tail rotor gearbox support assembly 50 also includes upper and lower support crossbars 54, 56 coupled to the top and bottom sides of tail rotor gearbox 46, respectively. The forward ends of upper and lower support crossbars 54, 56 are fixedly coupled to the forward portion of shroud 48 and the aft ends of upper and lower support crossbars 54, 56 are fixedly coupled to support column 52. Support column 52, upper and lower support crossbars 54, 56, tail rotor driveshaft 44 and tail rotor gearbox 46 may all lie within a common plane. During operation, tail rotor gearbox 46 experiences torque loads 58 and thrust loads 60. Thrust loads 60 can cause tail rotor hub 34 to deflect out of shroud 48. Tail rotor gearbox support assembly 50 prevents tail rotor hub 34 and tail rotor gearbox 46 from deflecting out of shroud 48 and reacts to torque and thrust loads 58, 60. In particular, tail rotor gearbox support assembly 50 reacts to torque and thrust loads 58, 60 by transferring or redirecting torque and thrust loads 58, 60 to a stable and supported structure of helicopter 10 such as tailboom 22. For example, upper and lower support crossbars 54, 56 may be driven to a line of action that directs torque and thrust loads 58, 60 to tailboom 22. Tail rotor gearbox support assembly 50 reacts loads due, at least in part, to the mass of tail rotor gearbox 46 and tail rotor assembly 26. Support column 52 may also react to bending loads of tail rotor assembly 26.

It should be appreciated that helicopter 10 is merely illustrative of a variety of aircraft that can implement the embodiments disclosed herein. Indeed, tail rotor gearbox support assembly 50 may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones and the like. As such, those skilled in the art will recognize that tail rotor gearbox support assembly 50 can be integrated into a variety of aircraft configurations. It should be appreciated that even though aircraft are particularly well-suited to implement the embodiments of the present disclosure, non-aircraft vehicles and devices can also implement the embodiments.

Figure 2A:
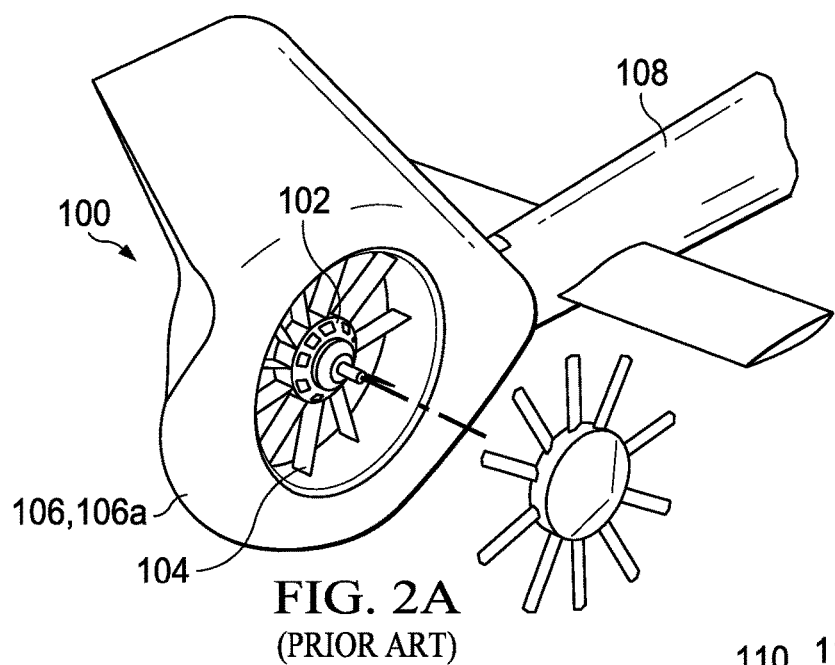
FIGS. 2A-2C are various views of existing tail rotor assemblies.
Figure 2B:
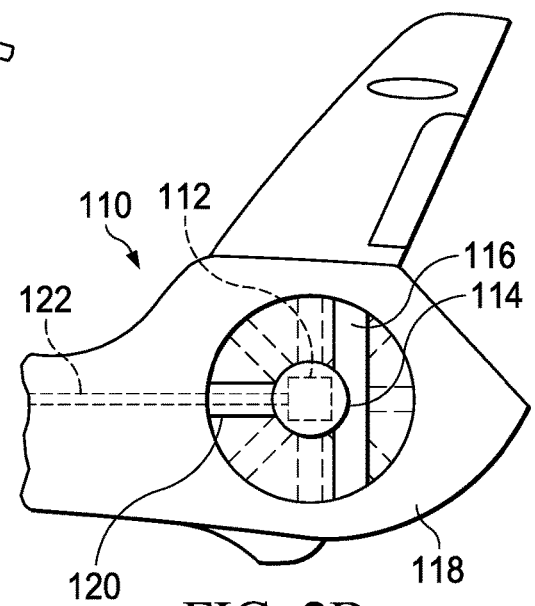
Figure 2C:
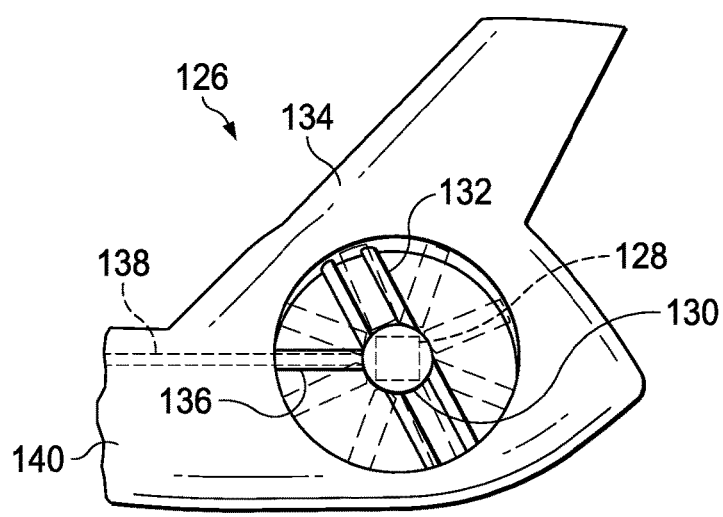

Referring to FIGS. 2A-2C in the drawings, various existing shrouded tail rotor assemblies are schematically illustrated. In FIG. 2A, shrouded tail rotor assembly 100 includes a tail rotor gearbox housing 102 in which a tail rotor gearbox (not shown) is encased. Spokes 104 radially emanate from tail rotor gearbox housing 102 to connect tail rotor gearbox housing 102 to shroud 106. Spokes 104 distribute the loads experienced by the tail rotor gearbox to the entire circumference of shroud 106, thereby requiring aft portion 106a of shroud 106 to be heavy enough to support such loads. Shrouded tail rotor assembly 100 thus fails to effectively transfer tail rotor gearbox loads to tailboom 108 to reduce the weight penalty of aft portion 106a of shroud 106. The tail rotor gearbox also requires tail rotor gearbox housing 102, further adding to the weight of shrouded tail rotor assembly 100. In FIG. 2B, shrouded tail rotor assembly 110 includes tail rotor gearbox 112 encased by tail rotor gearbox housing 114. Tail rotor gearbox housing 114 is mounted to vertical post 116. Tail rotor gearbox housing 114 is also mounted to shroud 118 by a tail rotor driveshaft casing 120, which encases an aft portion of tail rotor driveshaft 122. Because shrouded tail rotor assembly 110 relies upon a single horizontal tube that encases driveshaft 122 (tail rotor driveshaft casing 120), shrouded tail rotor assembly 110 is susceptible to catastrophic failure should tail rotor driveshaft casing 120 fail and either dislodge tail rotor gearbox 112 or cause tail rotor driveshaft 122 to malfunction. Shrouded tail rotor assembly 110 also requires that tail rotor gearbox 112 be encased by tail rotor gearbox housing 114, adding additional weight to shrouded tail rotor assembly 110.

In FIG. 2C, a shrouded tail rotor assembly 126 includes tail rotor gearbox 128 encased by tail rotor gearbox housing 130. Diagonal beams 132, which are parallel to one another, couple tail rotor gearbox housing 130 to shroud 134. Tail rotor gearbox housing 130 is also coupled to shroud 134 by horizontal tail rotor driveshaft casing 136 through which tail rotor driveshaft 138 extends. Like shrouded tail rotor assemblies 100 and 110 in FIGS. 2A-2B, shrouded tail rotor assembly 126 requires a tail rotor gearbox housing 130 to support tail rotor gearbox 128 within shroud 134. Indeed, none of shrouded tail rotor assemblies 100, 110 or 126 allow for direct connections to the tail rotor gearbox, opting instead for the heavier alternative of requiring a tail rotor gearbox housing. The positioning of diagonal beams 132 and tail rotor driveshaft casing 136 also fail to effectively transfer loads to tailboom 140. A lighter and more effective system for supporting a tail rotor gearbox within a shrouded tail rotor assembly is needed to rectify the deficiencies of existing shrouded tail rotor assemblies.

Referring to FIGS. 3A-3C in the drawings, a tail rotor assembly for a helicopter is schematically illustrated and generally designated 200. Tail rotor assembly 200 includes tail rotor hub 202 with tail rotor blades 204 emanating radially therefrom. Tail rotor hub 202 receives rotational energy from a drivetrain of the helicopter including tail rotor driveshaft 206 and tail rotor gearbox 208. Tail rotor gearbox 208 is supported centrally within shroud 210 by tail rotor gearbox support assembly 212. Tail rotor gearbox support assembly 212 includes support column 214 coupled to the aft side of tail rotor gearbox 208. Support column 214 is substantially vertical, although in other embodiments support column 214 may be nonvertically or diagonally oriented. The aft side of tail rotor gearbox 208 is coupled to support column 214 at or near midpoint 214a of support column 214. Tail rotor gearbox support assembly 212 also includes upper and lower support crossbars 216, 218 coupled to the top and bottom sides of tail rotor gearbox 208, respectively. The aft ends of upper and lower support crossbars 216, 218 are coupled to support column 214 by tee connectors 220, 222, respectively. Upper and lower support crossbars 216, 218 are substantially horizontal and parallel to one another, although in other embodiments upper and lower support crossbars 216, 218 may be nonhorizontal and/or nonparallel to one another. Also, while upper and lower support crossbars 216, 218 are illustrated as being parallel to tail rotor driveshaft 206, either or both of upper and lower support crossbars 216, 218 may form a nonparallel relationship with tail rotor driveshaft 206.

Tail rotor blade sweep over the nonradial, horizontally-oriented upper and lower support crossbars 216, 218 and the nonradial, vertically-oriented support column 214 is relatively gradual as compared to radially-oriented support struts or spokes that cause instantaneous blade sweep and shallow induced pressure (loading) gradients on tail rotor blades 204. Thus, the nonradial orientations of support column 214 and upper and lower support crossbars 216, 218 reduce induced blade loading noise. Support column 214 and upper and lower support crossbars 216, 218 may each have an aerodynamic cross-sectional shape to further reduce the noise and drag of tail rotor assembly 200. In particular, support column 214 and upper and lower support crossbars 216, 218 may be aerodynamically shaped relative to the airflow produced by tail rotor hub 202 toward tail rotor gearbox support assembly 212. The aerodynamic cross-sectional shape of support column 214 and upper and lower support crossbars 216, 218 may be an airfoil, circular, elliptical, polygonal, irregular or any other aerodynamic shape. For example, the sides of support column 214 and upper and lower support crossbars 216, 218 that face tail rotor hub 202 may have a rounded shape. Unlike the existing shrouded tail rotor assemblies illustrated in FIGS. 2A-2C, tail rotor gearbox support assembly 212 does not require tail rotor driveshaft 206 or tail rotor gearbox 208 to be housed or encased. Because tail rotor driveshaft 206 and/or tail rotor gearbox 208 may be exposed when implementing tail rotor gearbox support assembly 212, the weight of tail rotor assembly 200 is reduced.

Figure 4A:
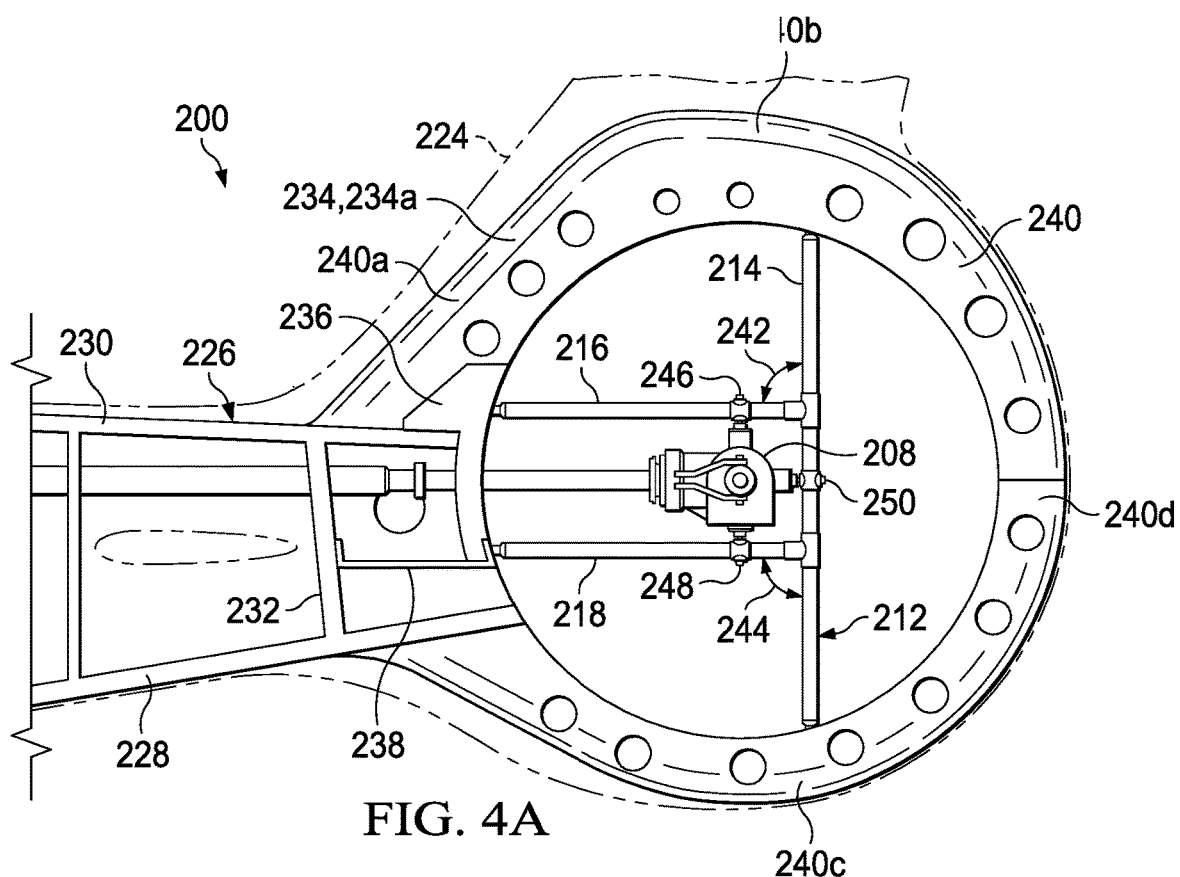
FIGS. 4A-4C are various views of a tail rotor gearbox support assembly in accordance with embodiments of the present disclosure.
Figure 4B:
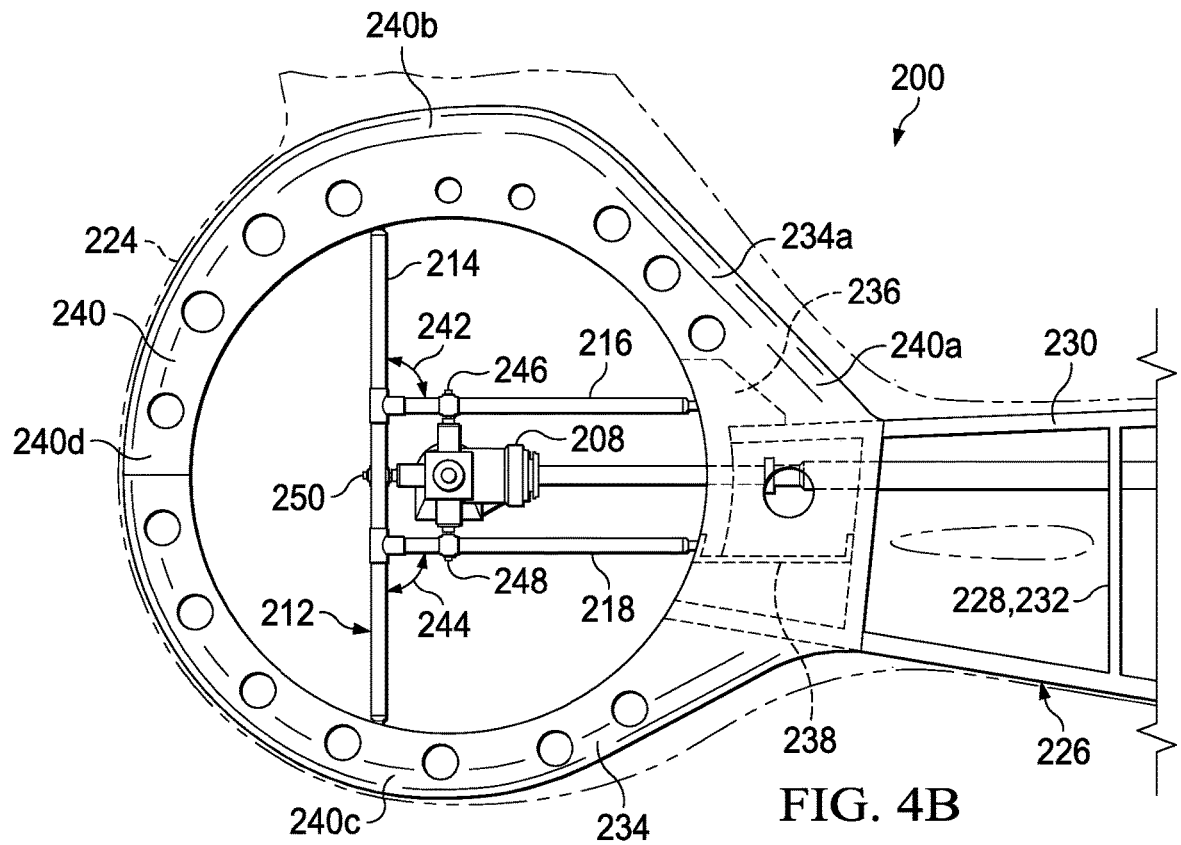
Figure 4C:
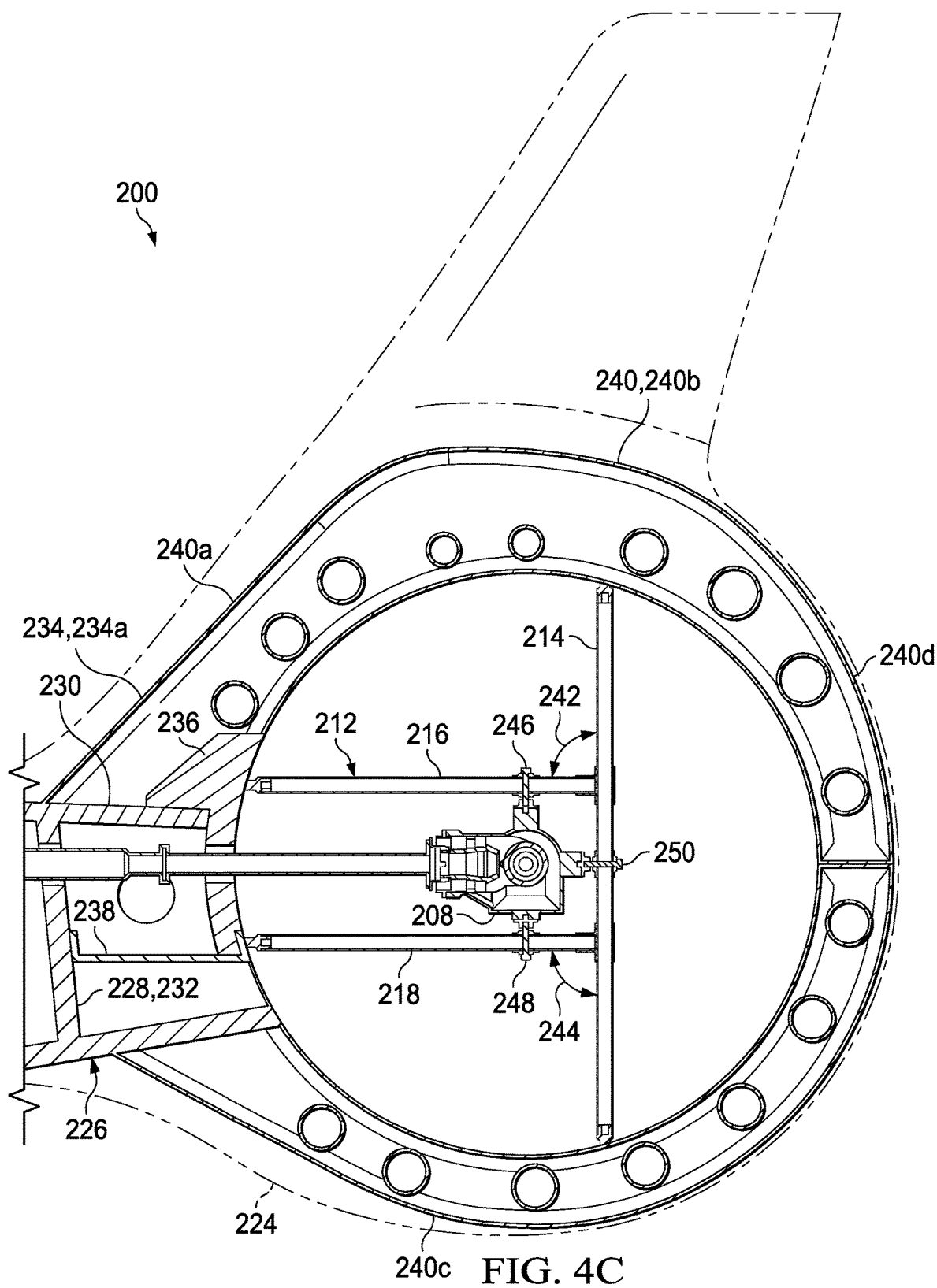

Referring to FIGS. 4A-4C in the drawings, tail rotor assembly 200 is schematically illustrated in the side views of FIGS. 4A-4B and the cross-sectional view of FIG. 4C with shroud skin 224 and the tail rotor hub hidden from view to more clearly illustrate tail rotor gearbox support assembly 212. Tailboom 226 is supported by a tailboom airframe 228 that includes frames, ribs, longerons 230, stringers, bulkheads, struts 232 interconnecting longerons 230 and/or other elements that provide structural support to absorb the torque and thrust loads of tail rotor assembly 200 via tail rotor gearbox support assembly 212. The structurally supportive elements of tailboom airframe 228 including longerons 230 and struts 232 may be solid or hollow and have any cross-sectional shape based on operational needs. Each support of tail rotor gearbox support assembly 212 including support column 214 and upper and lower support crossbars 216, 218 is directly or indirectly coupled or tied into a structural element of tailboom airframe 228 such as longerons 230 and/or struts 232 to maximize the stability of tail rotor gearbox 208 when reacting to torque and thrust loads. Portions of a shroud airframe 234 may be used to structurally couple tail rotor gearbox support assembly 212 to tailboom airframe 228. Forward portion 234a of shroud airframe 234 is coupled to tailboom airframe 228. Forward portion 234a of shroud airframe 234 includes a forward support boot 236 structurally interposed between the forward ends of upper and lower support crossbars 216, 218 and one or more of longerons 230 of tailboom airframe 228. A forward support strap 238 couples the forward end of lower support crossbar 218 to one or more of struts 232 of tailboom airframe 228. While upper and lower support crossbars 216, 218 are illustrated as being indirectly coupled to tailboom airframe 228 via intervening shroud airframe elements including forward support boot 236 and forward support strap 238, in other embodiments the forward ends of upper and lower support crossbars 216, 218 may be directly coupled to one or more structural elements of tailboom airframe 228 such as longerons 230 or struts 232. Upper and lower support crossbars 216, 218 may also be coupled to a forward portion 240a of shroud airframe ring 240, which is itself coupled to tailboom airframe 228. The top end of support column 214 is coupled to top portion 240b of shroud airframe ring 240 and the bottom end of support column 214 is coupled to the bottom portion 240c of shroud airframe ring 240. Thus, tail rotor gearbox support assembly 212 is structurally tied into the forward, top and bottom portions of shroud airframe 234, itself supported by tailboom airframe 228 to enhance the stability and load reactions of tail rotor gearbox support assembly 212. Because tail rotor gearbox support assembly 212 does not couple to aft portion 240d of shroud airframe ring 240, aft portion 240d may be lighter or smaller to reduce the weight of tail rotor assembly 200.

Support column 214 is illustrated as a single and integral tube, although in other embodiments support column 214 may be formed from two or more coaxial beams or tubes having upper and lower portions. Support column 214 may also be straight, as illustrated, or alternatively may form a convex or concave curve. Angle 242 between upper support crossbar 216 and support column 214 and angle 244 between lower support crossbar 218 and support column 214 are right angles such that upper and lower support crossbars 216, 218 are perpendicular to support column 214. While angle 242 is illustrated as congruent to angle 244, in other embodiments angles 242, 244 may be noncongruent. In yet other embodiments, either or both of angle 242 or angle 244 may be an acute, obtuse or reflex angle. As best seen in FIG. 4C, which is a cross-sectional view taken along line 4C-4C in FIG. 1B, support column 214 and upper and lower support crossbars 216, 218 are tubular and therefore have hollow cores. In other embodiments, support column 214 and upper and lower support crossbars 216, 218 may be solid or semi-solid. For example, support column 214 and upper and lower support crossbars 216, 218 may have foam or honeycomb cores. Support column 214 and upper and lower support crossbars 216, 218 may be formed from any material capable of effectively reacting to the loads of tail rotor gearbox 208 including carbon or composite materials such as carbon fiber. Upper and lower support crossbars 216, 218 are coupled to tail rotor gearbox 208 by upper and lower crossbar pin joint assemblies 246, 248, respectively. Support column 214 is coupled to tail rotor gearbox 208 by column pin joint assembly 250.

Figure 5B:
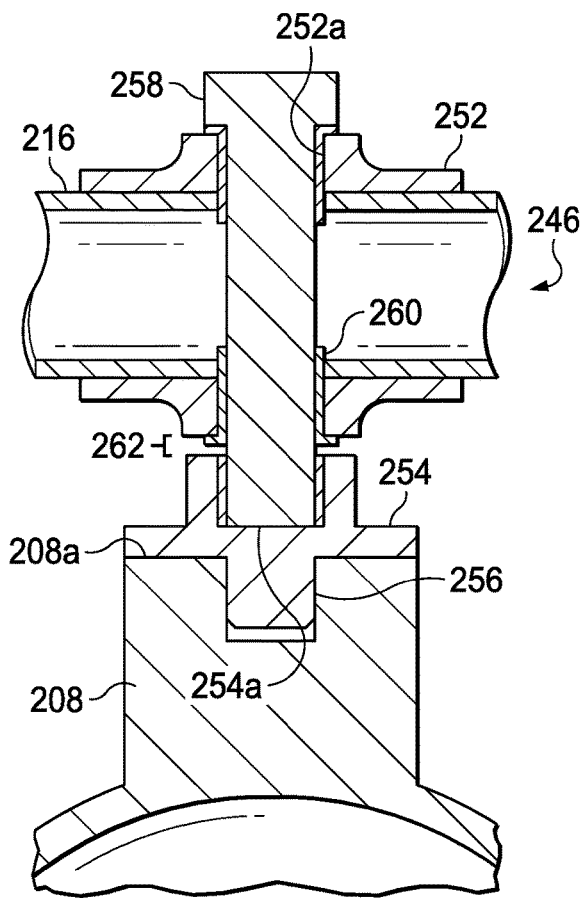

Referring to FIGS. 5A-5D in the drawings, pin joint assemblies 246, 248, 250 as well as other portions of tail rotor gearbox support assembly 212 are schematically illustrated. Upper crossbar pin joint assembly 246 couples upper support crossbar 216 to top side 208a of tail rotor gearbox 208. As best seen in FIG. 5B, upper crossbar pin joint assembly 246 includes a support crossbar fitting 252 around upper support crossbar 216. Support crossbar fitting 252 forms an aperture 252a. Upper crossbar pin joint assembly 246 also includes a tail rotor gearbox fitting 254 coupled on top side 208a of tail rotor gearbox 208. Tail rotor gearbox fitting 254 may be coupled to top side 208a of tail rotor gearbox 208 in any manner such as by utilizing a pin-and-receiver interference joint 256, fasteners, adhesive or other coupling technique. Upper crossbar pin joint assembly 246 also includes a pin, bolt or other fastener 258 that is insertable through support crossbar fitting 252 at aperture 252a and upper support crossbar 216 and received by receiver slot 254a of tail rotor gearbox fitting 254. Bushings 260 are positioned along aperture 252a of support crossbar fitting 252 and receiver slot 254a of tail rotor gearbox fitting 254 to secure pin 258 in its engaged position. A gap 262 is formed between support crossbar fitting 252 and tail rotor gearbox fitting 254 when pin 258 is engaged, although in other embodiments gap 262 may be eliminated. In embodiments in which gap 262 is reduced or eliminated, gap 262 may be shimmed using one or more shims (not shown) or a shoulder (not shown) may be used on pin 258 that bears up against the top of tail rotor gearbox fitting 254. In yet other embodiments in which gap 262 is reduced or eliminated, a jam nut or other part (not shown) threaded onto or disposed adjacent to pin 258 may be added between support crossbar fitting 252 and tail rotor gearbox fitting 254.

Figure 5C:
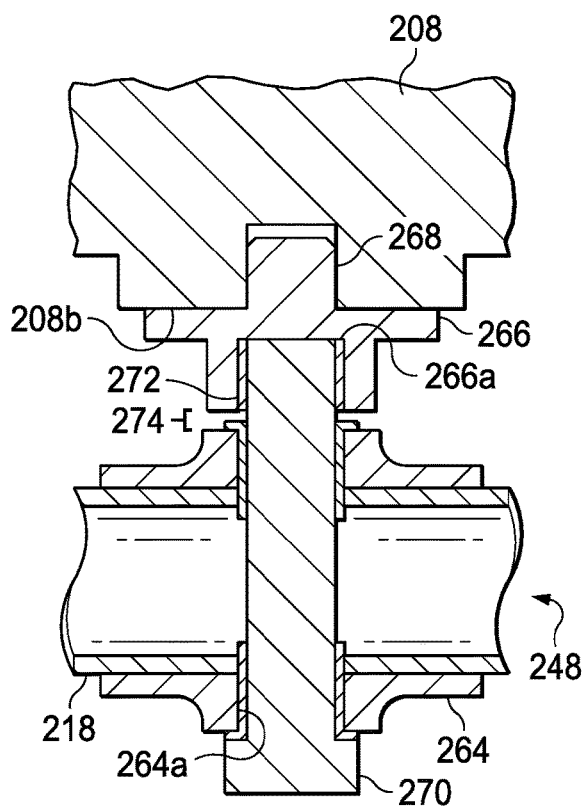

Lower crossbar pin joint assembly 248 couples lower support crossbar 218 to bottom side 208b of tail rotor gearbox 208. As best seen in FIG. 5C, lower crossbar pin joint assembly 248 includes support crossbar fitting 264 around lower support crossbar 218. Support crossbar fitting 264 forms an aperture 264a. Lower crossbar pin joint assembly 248 also includes tail rotor gearbox fitting 266 coupled on bottom side 208b of tail rotor gearbox 208. Tail rotor gearbox fitting 266 may be coupled to bottom side 208b of tail rotor gearbox 208 in any manner such as by utilizing pin-and-receiver interference joint 268, fasteners, adhesive or other coupling technique. Lower crossbar pin joint assembly 248 also includes pin, bolt or other fastener 270 that is insertable through support crossbar fitting 264 at aperture 264a and lower support crossbar 218 and received by receiver slot 266a of tail rotor gearbox fitting 266. Bushings 272 are positioned along aperture 264a of support crossbar fitting 264 and receiver slot 266a of tail rotor gearbox fitting 266 to secure pin 270 in its engaged position. Gap 274 is formed between support crossbar fitting 264 and tail rotor gearbox fitting 266 when pin 270 is engaged, although in other embodiments gap 274 may be eliminated. In embodiments in which gap 274 is reduced or eliminated, gap 274 may be shimmed using one or more shims (not shown) or a shoulder (not shown) may be used on pin 270 that bears up against the bottom of tail rotor gearbox fitting 266. In yet other embodiments in which gap 274 is reduced or eliminated, a jam nut or other part (not shown) threaded onto or disposed adjacent to pin 270 may be added between support crossbar fitting 264 and tail rotor gearbox fitting 266.

Figure 5D:
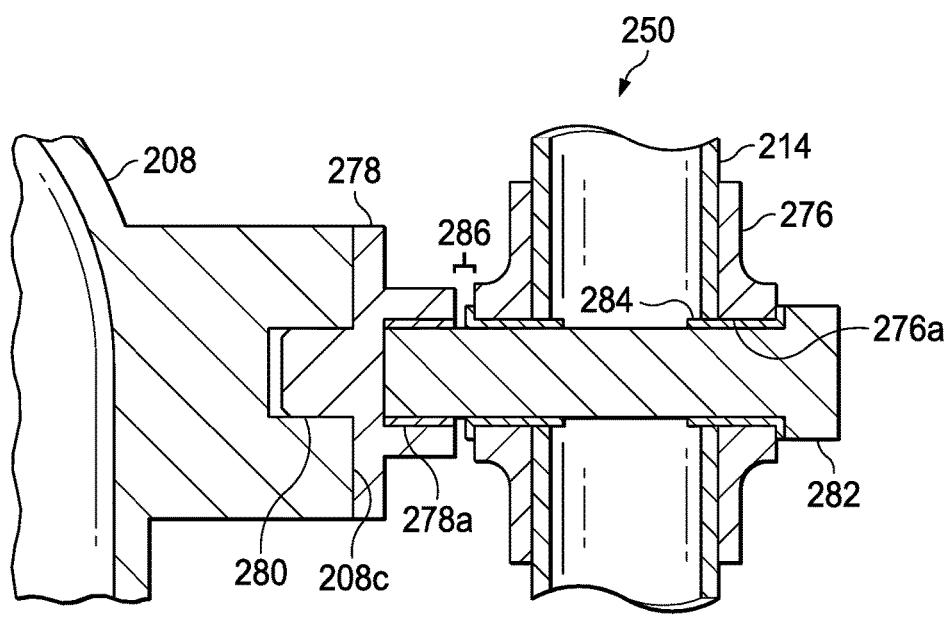

Column pin joint assembly 250 couples support column 214 to aft side 208c of tail rotor gearbox 208. As best seen in FIG. 5D, column pin joint assembly 250 includes support column fitting 276 around support column 214. Support column fitting 276 forms an aperture 276a. Column pin joint assembly 250 also includes tail rotor gearbox fitting 278 coupled on aft side 208c of tail rotor gearbox 208. Tail rotor gearbox fitting 278 may be coupled to aft side 208c of tail rotor gearbox 208 in any manner such as by utilizing pin-and-receiver interference joint 280, fasteners, adhesive or other coupling technique. Column pin joint assembly 250 also includes pin, bolt or other fastener 282 that is insertable through support column fitting 276 at aperture 276a and support column 214 and received by receiver slot 278a of tail rotor gearbox fitting 278. Bushings 284 are positioned along aperture 276a of support column fitting 276 and receiver slot 278a of tail rotor gearbox fitting 278 to secure pin 282 in its engaged position. Gap 286 is formed between support column fitting 276 and tail rotor gearbox fitting 278 when pin 282 is engaged, although in other embodiments gap 286 may be eliminated. In embodiments in which gap 286 is reduced or eliminated, gap 286 may be shimmed using one or more shims (not shown) or a shoulder (not shown) may be used on pin 282 that bears up against the aft side of tail rotor gearbox fitting 278. In yet other embodiments in which gap 286 is reduced or eliminated, a jam nut or other part (not shown) threaded onto or disposed adjacent to pin 282 may be added between support column fitting 276 and tail rotor gearbox fitting 278.

Support crossbar fittings 252, 264 and support column fitting 276 may partially or fully surround, or glove, upper support crossbar 216, lower support crossbar 218 and/or support column 214, respectively. In the illustrated embodiment, support crossbar fittings 252, 264 fully surround upper and lower support crossbars 216, 218, respectively, and support column fitting 276 partially surrounds support column 214. Support crossbar fittings 252, 264 and support column fitting 276 may be formed from any material capable of securing upper and lower support crossbars 216, 218 and support column 214, respectively, including composite materials and metallic materials such as machined aluminum. Pins 258, 270, 282 are unthreaded relative to tail rotor gearbox fittings 254, 266, 278 and no rotation of upper or lower support crossbars 216, 218 or support column 214 is permitted about pins 258, 270, 282, respectively. In other embodiments, all or a portion of pins 258, 270, 282 may be threaded into tail rotor gearbox fittings 254, 266, 278, respectively. Pins 258, 270, 282 may also be threaded or unthreaded, in any combination, relative to fittings 252, 264, 276 depending on the embodiment. In one example, one of pins 258, 270, 282 may be a threaded bolt that locks tail rotor gearbox 208 into a hard-mounted position with little or no freedom of movement relative to tail rotor gearbox support assembly 212. One or all of pin joint assemblies 246, 248, 250 may utilize a threaded bolt to lock out the position of tail rotor gearbox 208 in this manner. For example, each pin 258, 270, 282 may be hard-mounted into tail rotor gearbox fittings 254, 266, 278 (such as by using threads or another coupling technique) to restrain the movement of tail rotor gearbox 208 along the axes defined by pins 258, 270, 282. In the illustrated embodiment, tail rotor gearbox 208 is free-floating due to the freedom of movement provided by gaps 262, 274, 286. Gaps 262, 274, 286 accommodate thermal expansion of tail rotor gearbox 208 to keep tail rotor gearbox 208 aligned without rigid bonding. Gaps 262, 274, 286 also reduce the thermal load or pressure on tail rotor gearbox support assembly 212 when tail rotor gearbox 208 thermally expands. Tail rotor gearbox support assembly 212 continues to effectively transfer torque and thrust loads from tail rotor gearbox 208 should one of pins 258, 270, 282 fail, thereby providing a more fail-safe design for increased safety. Pins 258, 270, 282 may also be removed from pin joint assemblies 246, 248, 250 to allow for the removal of tail rotor gearbox 208 for convenient maintenance.

As best seen in FIG. 5A, support column 214 and upper and lower support crossbars 216, 218 are radially nonaligned with axis of rotation 288 along mast 290 of the tail rotor assembly, as support column 214 and upper and lower support crossbars 216, 218 extend along respective axes that do not intersect axis of rotation 288. Conversely, pins 258, 270, 282 are radially aligned with axis of rotation 288 since pins 258, 270, 282 extend along axes 292 radially emanating from and intersecting axis of rotation 288. Orienting pins 258, 270, 282 toward axis of rotation 288 also accommodates the thermal growth of tail rotor gearbox 208, which thermally expands radially outward along axes 292. Orienting pins 258, 270, 282 along radial axes 292 also reduces or prevents movement of tail rotor gearbox 208 when tail rotor gearbox 208 thermally expands, thereby maintaining the position of axis of rotation 288 during thermal expansion. Tail rotor gearbox 208 may be moveable along one or more of axes 292 defined by pins 258, 270, 282 depending on which, if any, of pins 258, 270, 282 is unconstrained or unthreaded relative to tail rotor gearbox fittings 254, 266, 278.

Tee connectors 220, 222 couple the aft ends of upper and lower support crossbars 216, 218 to support column 214, respectively. Support column 214, upper support crossbar 216 and/or lower support crossbar 218 may be coupled to tee connectors 220, 222 using an interference fit, fasteners, adhesive or any other coupling technique. While tee connectors 220, 222 are illustrated as fully surrounding or gloving support column 214, in other embodiments tee connectors 220, 222 may partially surround support column 214. Also, while tee connectors 220, 222 are illustrated as contacting the outer surfaces of upper and lower support crossbars 216, 218, in other embodiments tee connectors 220, 222 may be inserted into the aft ends of upper and lower support crossbars 216, 218. Tee connectors 220, 222 may be formed from any material capable of securing upper and lower support crossbars 216, 218 and support column 214 including composite materials and metallic materials such as machined aluminum.

Figure 6:
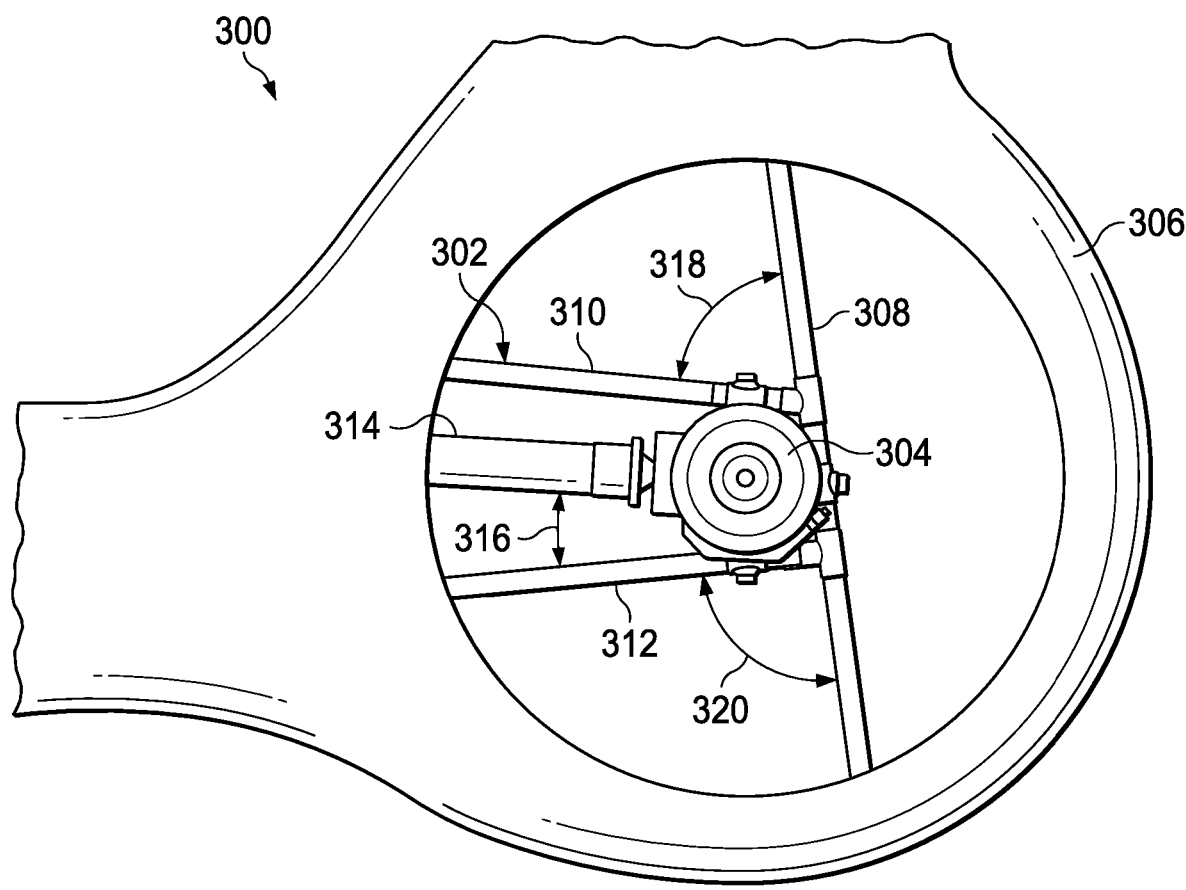
FIG. 6 is a side view of a tail rotor gearbox support assembly in accordance with embodiments of the present disclosure.

Referring to FIG. 6 in the drawings, a tail rotor assembly is schematically illustrated and generally designated 300. Tail rotor assembly 300 includes tail rotor gearbox support assembly 302 to support tail rotor gearbox 304 within shroud 306. Support column 308 is in a nonvertical and diagonal position. Additionally, upper and lower support crossbars 310, 312 are nonhorizontal and nonparallel to one another. Upper support crossbar 310 is parallel to tail rotor driveshaft 314. Lower support crossbar 312, however, is nonparallel to tail rotor driveshaft 314, forming angle 316. Angle 316 may be any acute angle. In other embodiments, both upper and lower support crossbars 310, 312 may be nonparallel to tail rotor driveshaft 314. Upper support crossbar 310 may form an acute angle 318 with support column 308 and lower support crossbar 312 may form a right or obtuse angle 320 with support column 308. Angles 318 and 320 are noncongruent. Angles 318 and 320 may be acute, right or obtuse angles depending on the configuration of tail rotor gearbox support assembly 302. Tail rotor gearbox support assembly 302 illustrates that support column 308 and upper and lower support crossbars 310, 312 can have numerous orientations relative to one another as suitable for the particular aircraft on which tail rotor gearbox support assembly 302 is implemented.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tail rotor assembly configured to be coupled to a tailboom of a helicopter, the tailboom having an aft end and a tailboom airframe, the tail rotor assembly comprising:
   a tail rotor gearbox having top, bottom and aft sides;
   a shroud including a shroud airframe having top and bottom portions configured to be coupled to the aft end of the tailboom, the shroud surrounding the tail rotor gearbox; and
   a tail rotor gearbox support assembly configured to support the tail rotor gearbox within the shroud, the tail rotor gearbox support assembly comprising:
      a support column coupled to the aft side of the tail rotor gearbox, the support column having a top end coupled to the top portion of the shroud airframe and a bottom end coupled to the bottom portion of the shroud airframe;
      a substantially horizontal upper support crossbar coupled to the top side of the tail rotor gearbox, the upper support crossbar having a forward end configured to be coupled to the tailboom airframe and an aft end coupled to the support column; and
      a substantially horizontal lower support crossbar coupled to the bottom side of the tail rotor gearbox, the lower support crossbar having a forward end configured to be coupled to the tailboom airframe and an aft end coupled to the support column;
   wherein, the aft side of the tail rotor gearbox is coupled to a middle portion of the support column.

2. The tail rotor assembly as recited in claim 1 wherein each of the upper and lower support crossbars is perpendicular to the support column.

3. The tail rotor assembly as recited in claim 1 wherein each of the upper and lower support crossbars is nonperpendicular to the support column.

4. The tail rotor assembly as recited in claim 1 wherein the upper and lower support crossbars are substantially parallel.

5. The tail rotor assembly as recited in claim 1 wherein the support column is nonvertical.

6. The tail rotor assembly as recited in claim 1 wherein the support column is a tubular support column; and wherein, the upper and lower support crossbars are tubular support crossbars.

7. The tail rotor assembly as recited in claim 1 wherein the tail rotor gearbox experiences torque and thrust loads during tail rotor operation and wherein the tail rotor gearbox support assembly transfers the torque and thrust loads to the tailboom.

8. The tail rotor assembly as recited in claim 1 wherein the tail rotor gearbox support assembly further comprises first and second tee connectors, the first tee connector coupling the aft end of the upper support crossbar to the support column and the second tee connector coupling the aft end of the lower support crossbar to the support column.

9. The tail rotor assembly as recited in claim 1 wherein the tail rotor gearbox support assembly further comprises:
    a column pin joint assembly coupling the support column to the aft side of the tail rotor gearbox;
    an upper crossbar pin joint assembly coupling the upper support crossbar to the top side of the tail rotor gearbox; and
    a lower crossbar pin joint assembly coupling the lower support crossbar to the bottom side of the tail rotor gearbox.

10. A tail rotor assembly configured to be coupled to a tailboom of a helicopter, the tailboom having an aft end and a tailboom airframe, the tail rotor assembly comprising:
    a tail rotor gearbox having top, bottom and aft sides;
    a shroud including a shroud airframe having top and bottom portions configured to be coupled to the aft end of the tailboom, the shroud surrounding the tail rotor gearbox; and
    a tail rotor gearbox support assembly configured to support the tail rotor gearbox within the shroud, the tail rotor gearbox support assembly comprising:
        a support column coupled to the aft side of the tail rotor gearbox, the support column having a top end coupled to the top portion of the shroud airframe and a bottom end coupled to the bottom portion of the shroud airframe;
        an upper support crossbar coupled to the top side of the tail rotor gearbox, the upper support crossbar having a forward end configured to be coupled to the tailboom airframe and an aft end coupled to the support column; and
        a lower support crossbar coupled to the bottom side of the tail rotor gearbox, the lower support crossbar having a forward end configured to be coupled to the tailboom airframe and an aft end coupled to the support column;
    wherein, the upper and lower support crossbar are nonparallel with each other; and
    wherein, the aft side of the tail rotor gearbox is coupled to a middle portion of the support column.

11. The tail rotor assembly as recited in claim 10 wherein the lower support crossbar is nonperpendicular to the support column.

12. The tail rotor assembly as recited in claim 10 wherein the upper support crossbar is nonperpendicular to the support column.

13. The tail rotor assembly as recited in claim 10 wherein each of the upper and lower support crossbars is nonperpendicular to the support column.

14. The tail rotor assembly as recited in claim 10 wherein the lower support crossbar is nonhorizontal.

15. The tail rotor assembly as recited in claim 10 wherein the upper support crossbar is nonhorizontal.

16. The tail rotor assembly as recited in claim 10 wherein each of the upper and lower support crossbars is nonhorizontal.

17. The tail rotor assembly as recited in claim 10 wherein the support column is nonvertical.

18. The tail rotor assembly as recited in claim 10 wherein the tail rotor gearbox experiences torque and thrust loads during tail rotor operation and wherein the tail rotor gearbox support assembly transfers the torque and thrust loads to the tailboom.

19. The tail rotor assembly as recited in claim 10 wherein the tail rotor gearbox support assembly further comprises first and second tee connectors, the first tee connector coupling the aft end of the upper support crossbar to the support column and the second tee connector coupling the aft end of the lower support crossbar to the support column.

20. The tail rotor assembly as recited in claim 10 wherein the tail rotor gearbox support assembly further comprises:
    a column pin joint assembly coupling the support column to the aft side of the tail rotor gearbox;
    an upper crossbar pin joint assembly coupling the upper support crossbar to the top side of the tail rotor gearbox; and
    a lower crossbar pin joint assembly coupling the lower support crossbar to the bottom side of the tail rotor gearbox.

* * * * *